United States Patent [19]  [11] 4,080,316
Holda et al.  [45] Mar. 21, 1978

[54] WATER-SOLUBLE POLYESTER BULKING RESIN

[75] Inventors: Eugene M. Holda, Glen Ellyn; John C. Lark, St. Charles, both of Ill.

[73] Assignee: Standard Oil Company (Indiana), Chicago, Ill.

[21] Appl. No.: 780,601

[22] Filed: Mar. 24, 1977

Related U.S. Application Data

[62] Division of Ser. No. 654,702, Feb. 2, 1976, and Ser. No. 534,158, Dec. 19, 1974, Pat. No. 3,975,566.

[51] Int. Cl.$^2$ ............................................. C08G 63/20
[52] U.S. Cl. .............................. 260/75 R; 260/75 T; 260/76; 260/850; 260/860
[58] Field of Search .................... 260/75 R, 75 T, 76, 260/850, 860

[56] References Cited

U.S. PATENT DOCUMENTS

| | | | |
|---|---|---|---|
| 3,387,059 | 6/1968 | Pajot | 260/842 |
| 3,652,502 | 3/1972 | Jackson et al. | 260/75 R |
| 3,741,937 | 6/1973 | Ehring et al. | 260/76 |
| 3,829,530 | 8/1974 | Powanda | 260/850 |

Primary Examiner—Lucille M. Phynes
Attorney, Agent, or Firm—William Magidson; Arthur G. Gilkes; William T. McClain

[57] ABSTRACT

A water-soluble polyester resin having a molecular weight of not more than about 4,000 and an acid number of at least 35 which comprises (1) a branched chain three-dimensional polyester core having an acid number less than about 25 comprising the reaction product of a polyhydroxyl compound, dicarboxylic acid compound, monocarboxylic acid compound and polycarboxylic acid compound having at least three acyl moieties, and (2) pendant carboxylic acid moieties comprising polycarboxylic acid compounds having at least three acyl moieties, wherein said polyester resin contains no non-benzenoid unsaturation and none of the hydroxyl compounds have secondary hydroxyl groups and compositions comprising an aminoplast suitable for use as polyester fabric bulking agents.

5 Claims, No Drawings

WATER-SOLUBLE POLYESTER BULKING RESIN

This is a division of application Ser. No. 654,702, filed Feb. 2, 1976, a division application of Ser. No. 534,158, filed on Dec. 19, 1974, now U.S. Pat. No. 3,975,566, granted Aug. 17, 1976.

This invention relates to polyester fabrics bearing a polyester bulking agent and polyester bulking compositions comprising an aminoplast and a polyester comprising a branched chain 3-dimensional core and pendant carboxylic acid moieties. More particularly, this invention relates to polyester fabrics bearing a cured composition comprising an aminoplast component and a polyester comprising (1) a branched chain 3-dimensional core, wherein said core polyester comprises the reaction product of a dihydric alcohol having only primary hydroxyl groups, saturated monocarboxylic acids having from about 2 to 24 carbon atoms, dicarboxylic acids and polycarboxylic acids having at least three acid groups and (2) pendant carboxylic acid groups.

Polyester textiles have reached a high level of consumer acceptance. Newer techniques have been developed for imparting aesthetically desirable properties to polyester fibers from which textiles are produced. Some of these techniques have been used to reduce the dense heavy feel of polyester textiles and to simulate the bulky, airy, light texture of natural fiber fabircs. For example, multi-lobal fibers have been developed to reduce the density of polyester fibers and to increase the surface area of the fiber. Various texturizing methods have been used to further increase the apparent cross-scetional area of polyester fibers and yarns. Further, it is common to use blends of polyester fibers and natural fibers (usually cotton or wool) for various purposes including giving the finished textile a bulk or weight per volume more nearly approaching cotton or wool fabrics. This last expediency cannot be used for producing today's very popular polyester double knits. Accordingly, there is a need for additional methods of producing polyester fabrics having enhanced bulk density and a lighter feel.

U.S. Pat. No. 3,763,064 of Soliday discloses that the hand of textile fabrics, particularly those produced from hydrophilic fibers can be improved by applying a two phase aqueous perchloroethylene emulsion of a particular polyester and a nonionic or anionic surfactant to reduce the stiffness of the fabric and that the permanency of this improved hand can be enhanced by using mixtures of the two phase composition and various formaldehyde reaction products. The polyesters suitable for accomplishing the patentee's purpose are based upon glycols, such as ethylene glycol, propylene glycol or mixtures of these glycols together with three different classes of polycarboxylic acids including an aromatic dicarboxylic acid, a dimerized aliphatic fatty acid and a lower unsaturated aliphatic dibasic acid having up to about 10 carbon atoms, preferably fumaric acid. While the patentee indicates that no formaldehyde reaction products or cure are necessary to obtain improved hand on hydrophobic fiber fabrics, such as polyester fabrics, these hydrophobic fabrics do not have and would not be expected to have resistance to dry cleaning solvents since perchloroethylene is a conventional dry cleaning solvent and the polyester resin utilized is specifically designed to be soluble in this solvent.

The general object of this invention is to provide bulking compositions for polyester fabrics to impart improved bulk density to said fabrics. A more specific object of this invention is to provide polyester fabrics having a bulk density more nearly approaching natural fiber fabrics than those previously produced and an improved hand. Other objects appear hereinafter.

I have now found that it is possible to improve the bulk density of polyester fabrics by treating the polyester fabric with a water-soluble polyester bulking resin, preferably together with an aminoplast resin. The water-soluble polyester bulking resins useful in this invention have a molecular weight of no more than about 4000, an acid number of at least 35 and comprise (1) a branched chain 3-dimensional polyester core having an acid number less than about 25 comprising the reaction product of a polyhydroxy compound, dicarboxylic acid compound, polycarboxylic acid compound having at least three carboxylic acid or acyl moieties and monocarboxylic acid compound and (2) pendant carboxylic acid moieties comprising polycarboxylic acid compounds having at least three carboxylic acid or acyl moieties wherein said polyesters contain no non-benzenoid unsaturation and none of the hydroxy compounds have secondary hydroxyl groups. The three dimensional core of the polyester resins increase the bulk density of the treated fabrics while the pendant carboxylic acid groups are necessary to impart water-solubility to the polyester resins thereby facilitating application of the polyester resin to polyester fabrics from aqueous baths. The aforesaid aminoplast resins are preferably used in conjunction with the polyester resins to impart permanence to the improved bulkiness, e.g. resistance to loss on laundering and dry cleaning.

Each of the components in the polyester resin must conform to the aforesaid requirements. If the hydroxy compounds contain secondary hydroxyls, the polyester coating composition will yellow during use and/or wear of the polyester fabric thereby reducing the aesthetic value of the fabric with the result that the various colors on the polyester fabric appear dull or yellow. The components must also be free of non-benzenoid unsaturation in order to prevent or avoid the formation of chromophores during the curing of the polyester coating composition or use of the polyester fabric. As is well known, chromophores are undesirable since they are color bodies and detract from the aesthetic properties of the polyester fabrics.

In general, the preferred polyester bulking resins contain aliphatic acid groups containing on an average 6 to 12 carbon atoms to impart improved hand to the treated polyester fabrics. If the monofunctional compounds are omitted, the treated polyester fabrics tend to have a boardy texture.

To summarize, the preferred compositions of this invention can be applied to polyester fabrics using conventional techniques to obtain a bulky feel approximating the bulk density of natural fiber fabrics, enhanced hand, a dryer hand than untreated polyester fabrics, all of which properties can be maintained through several launderings or dry cleaning cycles.

Suitable saturated fatty acids useful in this invention include the straight chain normal acids containing from 2 to 24 carbon atoms, preferably 6 to 12 carbon atoms, such as acetic acid, propionic acid, hexanoic acid, heptanoic acid, octanoic acids, pelargonic acid, dodecanoic acid, stearic acid, palmitic acid, tetraconsanic acid, etc. In general, the longer the fatty acid chain, the softer the resulting finish.

Suitable dicarboxylic acids containing no non-benzenoid unsaturation include aromatic acids as phthalic acid, phthalic anhydride, isophthalic acid, terephthalic acid, etc.; saturated aliphatic dicarboxylic acids such as adipic acid, sebacic acid, suberic acid, etc.

Suitable polycarboxylic acids having at least three carboxyl or acyl moieties include trimellitic anydride, trimellitic acid, trimesic acid, pyromellitic acid, etc. In general from 20 to 90 equivalent percent of the polycarboxylic acid compound having at least three carboxyl or acyl groups in the polyester is in the backbone or core portion with from 10 to 80 equivalent percent in the pendant portion of the polyester bulking resin.

Suitable polyhydric alcohols having primary hydorxy groups useful in this invention include the polymethylene glycols containing from 2 to about 12 methylene groups between hydroxyl groups such as dimethylene glycol, dodecamethylene glycol; polyoxyethylene glycols; branched chain glycols containing hydroxyl groups on terminal carbon atoms such as neopentyl glycol, trimethylolethane, trimethylolpropane, pentaerythritol, etc. Of these neopentyl glycol is preferred since resins produced with this dihydroxy compound have somewhat better permanence after laundering.

The acyl equivalents in the core or backbone portion of the polyester can range from about 5 to 25 eqivalent percent monocarboxylic acid groups, 15 to 50 equivalent percent dicarboxylic acid groups and 30 to 60 equivalent percent polycarboxylic acid groups having at least three acyl moieties.

Saturated aliphatic carboxylic acids containing from 2 to 24 carbon atoms can be used in this invention. However, the acids containing 6 to 12 carbon atoms are preferred. In general the fatty acids must contain on an average at least 6 carbon atoms to impart a dry soft hand to the finish. As the number of carbon atoms in the acid decreases from 5 to 2, the treated polyester fabric takes on a progressively more boardly texture. On the other hand, fatty acids containing about 13 to 24 carbon atoms tend to impart a waxy texture to the polyester fabric when these higher fatty acids constitute more than about 5% by weight of the polyester.

In somewhat greater detail the first stage of the backbone polyester having an acid number of about 0 to 25 can be produced by condensing one or more polyhydric alcohols precursors and one or more dicarboxylic acid precursors, tricarboxylic acid precursors and monocarboxylic acids. The hydroxyl:carboxyl ratio must be at least 1.1:1 in order to provide sufficient terminal or internal hydroxyl groups in the substantially linear polyester for reaction in the last stage with the polycarboxylic acid compound having at least 3 acyl groups. After the polyester backbone having an acid number of about 0 to 25 is produced, the remainder of the polycarboxylic acid compound having at least three acyl groups is condensed in the second stage to provide a water-soluble polyester having an acid number of at least 35, preferably 40 to 70. In some cases a second stage can be carried out wherein the fatty acid is condensed with the backbone or core polyester before the remainder of the polycarboxylic acid having at least three acyl groups is condensed in the last stage. In any case, the polyester is reduced to an acid number of from 0 to 25 before the polycarboxylic acid having at least three acyl groups is added. Typically, the preferred backbone polyester is formed by condensing the reactants at 300° to 500° F. until the polyester has an acid number of 0 to 25, the fatty acid is added and the acid number reduced to 0 to 25 at 300° to 350° F. and then a trimellitic acid compound is reacted at 250 to 480° which a polyester having an acid number of at least 35 is formed.

Any of the saturated fatty acid modified polyesters of this invention can be dissolved in water or aqueous medium containing cosolvent and/or base prior to blending with the aminoplasts. Suitable co-solvents include alcohols, such as pentanol, diethylene glycol monomethyl ether, propylene glycol monopropyl ether, etc. Suitable bases include ammoniam morpholine, alkali metal (sodium or potassium) hydroxides, etc.

The aminoplasts useful in this invention are preferably reaction products of triazines, preferably melamine, and aldehydes, normally formaldehyde, alone or together with various lower alcohols, such as methanol, ethanol, isopropanol, butanol, etc., any of the commercially available melamine-formaldehyde reaction products, whether modified with alcohol or not, can be used in this invention. In general, the aminoplasts can be used in the weight ratio (dry solid basis) of 5 to 50 parts by weight, preferably 10 to 25, per each 100 parts by weight polyester resin.

In those cases where durable press is desired the various durable press resins or urea-formaldehyde reaction products, such as dimethylol dihydroxy-ethylene urea, etc., can be added in conventional proportions. However, it is generally advisable to omit the conventional metal salt catalysts used for the durable press resins since these catalysts tend to be relatively incompatible with the polyester component of the bulking composition. The durable press resin can be cured advantageously without these catalysts with U.V.

Generally the components of the polyester bulking resin composition should be diluted with sufficient water to provide a .15 to 30% solids composition. The solids composition is adjusted to provide a weight pick up of bulking resin by the polyester fabric of from about 0.1% to 20% by weight (dry solids basis), preferably about 0.2 to 5% by weight pick up.

The compositions of this invention can be applied to the polyester fabric by conventional procedures for applying aqueous compositions, such as dipping, spraying, etc. The treated material is dried and the composition is heat cured at a temperature between 240° to 450° F., preferably between 280 to 380° F.

The following examples are merely illustrative.

EXAMPLE I

Five moles neopentyl glycol, 1.25 moles isophthalic acid and 1.1 moles trimellitic anhydride were charged to a reactor equipped with an agitator, nitrogen gas sparge and a steam-heated partial condenser. The reactor was heated at 450° to 460° F. while maintaining a maximum overhead temperatue of 215° F. until the reactants had an acid number of less than 10. Three moles pelargonic acid was added to the reactor while maintaining the reaction temperature at 430° to 440° F. until the reactants had an acid number of less than 10 and a viscosity at 80% nonvolatile in butoxyethanol of T+ (Garner-Holdt). The reactants were cooled to 410° F. and .77 moles trimellitic anhydride was added. The reactor was held at 410° F. until the reactants has an acid number of 42 to 44. cooled to 320° F. and maintained at this temperature until the polyester had an acid number of about 35 to 37. The polyester was cooled to room temperature and dissolved in Propasol P (1,2-propylene glycol monopropyl ether) to form an 80% solids solution, neutralized with concentrated ammonium hydroxide and then reduced to 5% solids in water at pH 5.5 to 7.5.

The polyester prepared in the preceding paragraph was placed into a bath alone or together with a suitable aminoplast. Spun woven polyester fabric (66 × 52), 30's yarn was immersed in the bath until the polyester wetted out, run through a wringer adjusted for 100% wet pick up based on fabric weight, put on a frame and dried in an oven at 120° C. for five minutes followed by 150° C. for five minutes. In all cases the apparent bulk of the polyester fabric was improved. The bath concentrations and results are set forth below in Table I:

Table I

| Bath Composition | | Retention of Bulk Agents | | |
|---|---|---|---|---|
| % by wt. polyester on dry solids basis | % by wt. aminoplast on an as is basis | Five Launderings | Two Dry Cleanings | Results |
| 5% | 0 | poor | fair to poor | Boardy hand |
| 5% | 1%.MM83* | excellent | excellent | Boardy hand |
| 3% | .6%MM83* | excellent | excellent | Full, dry hand |
| 1% | .2%MM83* | good to excellent | excellent | Rich, dry hand |
| 5% | 1%X-714* | excellent | excellent | Boardy hand |
| 3% | .6%X-714* | excellent | excellent | Full, dry hand |
| 1% | .2%X-714* | fair | excellent | Rich, dry hand |

*in the above table MM83 stands for an 80% solids Uformite MM83, which is a melamine/formaldehyde etherized with a 1:1 mixture of iospropanol/isobutanol, in a 1:1 mixture of isopropanol-/isobutanol and X-714 stands for an 80% solids Resimine X-714, which is melamine/formaldehyde etherized with isopropanol, in isopropanol.

When the example was repeated without trifunctional acid in the backbone polyester, a linear polyester was produced that only imparted stiffness and no bulk to the polyester fabric.

EXAMPLE II

Essentially the same bulking results set forth in Example I are obtained with a polyester produced in the manner described in Example I using 2.2 mole isophthalic acid, 5 moles neopentyl glycol and 0.75 moles trimellitic anydride in the first stage, 1.88 moles pelargonic acid in the second stage and .5 moles trimellitic anhydride in the third stage.

EXAMPLE III

Essentially the same bulking results set forth in Example I are obtained with a polyester produced in the manner described in Example I using 1.06 moles isophthalic acid, 5 moles neopentyl glycol and 1.2 moles trimellitic anhydride in the first stage, 1.88 moles pelargonic acid in the second stage and .8 moles trimellitic acid in the third stage.

EXAMPLE IV

When Example I was repeated using 5 moles ethylene glycol in place of 5 moles neopentyl glycol essentially the same results were obtained except that durability to laundering was poor.

While this invention is primarily directed to improving the bulk density of double knit polyester fabrics, the polyester resin compositions (resin and aminoplast) can be applied to polyester blend fabrics (cotton or wool), particularly durable press fabrics, to improve the abrasion resistance of the fabrics.

I claim:

1. A water-soluble polyester resin having a molecular weight of not more than about 4,000 and an acid number of at least 35 which comprises (1) a branched chain three-dimensional polyester core having an acid number less than about 25 comprising the reaction product of a polyhydroxyl compound, dicarboxylic acid compound, monocarboxylic acid compound and polycarboxylic acid compound having at least three acyl moieties, and (2) pendant carboxylic acid moieties comprising polycarboxylic acid compounds having at least three acyl moieties, wherein said polyester resin contains no non-benzenoid unsaturation and none of the hydroxy) compounds have secondary hydroxyl groups.

2. The composition of claim 1, wherein the monocarboxylic acid contains at least six carbon atoms and comprises from 5 to 25 equivalent percent of the acyl groups in the backbone portion of the polyester.

3. The composition of claim 2, wherein said monocarboxylic acid contains on an average from 6 to 12 carbon atoms.

4. The composition of claim 2, wherein from 20 to 90 equivalent percent of the polycarboxylic acid having at least three acyl groups in the polyester are in the backbone portion of the polyester with from 10 to 80 equivalent percent in the pendant portion of the polyester resin.

5. The composition of claim 4, wherein the polycarboxylic acid having at least three acyl groups in both the backbone and pendant portions of the polyester resin comprises a trimellitic acid compound.

* * * * *